United States Patent
Pliefke

(10) Patent No.: US 9,491,451 B2
(45) Date of Patent: Nov. 8, 2016

(54) CALIBRATION SYSTEM AND METHOD FOR VEHICULAR SURROUND VISION SYSTEM

(71) Applicant: MAGNA ELECTRONICS INC., Auburn Hills, MI (US)

(72) Inventor: Sebastian Pliefke, Sailauf (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 203 days.

(21) Appl. No.: 14/358,232

(22) PCT Filed: Nov. 14, 2012

(86) PCT No.: PCT/US2012/064980
§ 371 (c)(1),
(2) Date: May 15, 2014

(87) PCT Pub. No.: WO2013/074604
PCT Pub. Date: May 23, 2013

(65) Prior Publication Data
US 2014/0320658 A1    Oct. 30, 2014

Related U.S. Application Data

(60) Provisional application No. 61/559,970, filed on Nov. 15, 2011.

(51) Int. Cl.
*H04N 7/18* (2006.01)
*H04N 17/00* (2006.01)
(Continued)

(52) U.S. Cl.
CPC ............ *H04N 17/002* (2013.01); *B60R 1/002* (2013.01); *G06T 7/0018* (2013.01); *B60R 2300/402* (2013.01); *G06T 2207/10016* (2013.01); *G06T 2207/30252* (2013.01)

(58) Field of Classification Search
CPC ................ G06T 7/0018; G06T 2207/30252; H04N 17/002; B06R 1/002; B06R 2300/402
USPC ............ 348/148, 143, 135, 187, 151, 208.5; 382/103–104
See application file for complete search history.

(56) References Cited

U.S. PATENT DOCUMENTS

| 4,961,625 A | 10/1990 | Wood et al. |
| 4,966,441 A | 10/1990 | Conner |

(Continued)

FOREIGN PATENT DOCUMENTS

| EP | 0353200 | 1/1990 |
| EP | 0361914 | 2/1993 |

(Continued)

OTHER PUBLICATIONS

Achler et al., "Vehicle Wheel Detector using 2D Filter Banks," IEEE Intelligent Vehicles Symposium of Jun. 2004.

(Continued)

*Primary Examiner* — Helen Shibru
(74) *Attorney, Agent, or Firm* — Gardner, Linn, Burkhart & Flory, LLP

(57) ABSTRACT

A camera calibration system for calibrating cameras of a vehicle includes at least one reconfigurable calibration target established or disposed at a ground area at which a vehicle is positioned for a camera calibrating procedure. The camera calibration system is operable, responsive to an input indicative of a type or size of the vehicle positioned at the ground area, to reconfigure the at least one reconfigurable calibration target to adapt the calibration target for the particular type or size of the vehicle positioned thereat. The camera calibration system may reconfigure at least one of a size of the target and a location of the target. The camera calibration system may reconfigure the target via a covering element that selectively exposes a portion of the reconfigurable calibration target and covers another portion of the reconfigurable calibration target.

14 Claims, 15 Drawing Sheets

Calibration target positions for vehicle type B (shorter vehicle type)

(51) Int. Cl.
*G06T 7/00* (2006.01)
*B60R 1/00* (2006.01)

(56) References Cited

U.S. PATENT DOCUMENTS

| | | |
|---|---|---|
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,148,014 A | 9/1992 | Lynam |
| 5,166,681 A | 11/1992 | Bottesch et al. |
| 5,177,606 A | 1/1993 | Koshizawa |
| 5,182,502 A | 1/1993 | Slotkowski et al. |
| 5,193,029 A | 3/1993 | Schofield |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,445,287 B1 | 9/2002 | Schofield et al. |
| 6,477,464 B2 | 11/2002 | McCarthy et al. |
| 6,498,620 B2 | 12/2002 | Schofield et al. |
| 6,515,378 B2 | 2/2003 | Drummond et al. |
| 6,516,664 B2 | 2/2003 | Lynam |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |

(56) References Cited

U.S. PATENT DOCUMENTS

| | | |
|---|---|---|
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,196,721 B2 | 3/2007 | Uchiyama |
| 7,202,776 B2 | 4/2007 | Breed |
| 7,227,459 B2 | 6/2007 | Bos et al. |
| 7,227,611 B2 | 6/2007 | Hull et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,375,803 B1 | 5/2008 | Bamji |
| 7,380,948 B2 | 6/2008 | Schofield et al. |
| 7,388,182 B2 | 6/2008 | Schofield et al. |
| 7,423,821 B2 | 9/2008 | Bechtel et al. |
| 7,425,076 B2 | 9/2008 | Schofield et al. |
| 7,526,103 B2 | 4/2009 | Schofield et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,881,496 B2 | 2/2011 | Camilleri |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,100,568 B2 | 1/2012 | DeLine et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,534,887 B2 | 9/2013 | DeLine et al. |
| 8,553,088 B2 | 10/2013 | Stein et al. |
| 8,947,533 B2 * | 2/2015 | Bandou .............. G06K 9/00791 348/148 |
| 9,025,819 B2 * | 5/2015 | Sung .................. G06K 9/00805 382/103 |
| 9,193,303 B2 * | 11/2015 | Higgins-Luthman ..... B60R 1/00 |
| 9,275,458 B2 * | 3/2016 | Oh ........................ G06T 7/0018 |
| 2002/0005778 A1 | 1/2002 | Breed |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0130702 A1 * | 7/2004 | Jupp .................... G06K 9/0063 356/5.01 |
| 2004/0135992 A1 * | 7/2004 | Munro .................... G01S 17/10 356/4.01 |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2007/0024724 A1 | 2/2007 | Stein et al. |
| 2007/0104476 A1 | 5/2007 | Yasutomi et al. |
| 2007/0154067 A1 * | 7/2007 | Laumeyer .......... G06K 9/00818 382/103 |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2010/0194886 A1 | 8/2010 | Asari et al. |
| 2010/0238291 A1 | 9/2010 | Pavlov et al. |
| 2010/0253784 A1 | 10/2010 | Oleg |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1 | 12/2012 | Vico |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Rathi et al. |
| 2014/0063254 A1 | 3/2014 | Shi et al. |
| 2014/0098229 A1 | 4/2014 | Lu et al. |
| 2014/0160276 A1 * | 6/2014 | Pliefke .................... B60R 1/00 348/118 |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0217693 A1 * | 8/2015 | Pliefke .................... B60R 1/00 348/118 |

FOREIGN PATENT DOCUMENTS

| | | |
|---|---|---|
| EP | 0640903 | 3/1995 |
| EP | 0697641 | 2/1996 |
| EP | 1115250 | 7/2001 |
| EP | 2377094 | 10/2011 |
| EP | 2667325 | 11/2013 |
| GB | 2233530 | 9/1991 |
| JP | S5539843 | 3/1980 |
| JP | S58110334 | 6/1983 |
| JP | 6216073 | 4/1987 |
| JP | 6272245 | 5/1987 |
| JP | S62-131837 | 6/1987 |
| JP | 01123587 | 5/1989 |
| JP | H1168538 | 7/1989 |
| JP | H236417 | 8/1990 |
| JP | 03099952 | 4/1991 |
| JP | 3099952 | 4/1991 |
| JP | 6227318 | 8/1994 |
| JP | 07105496 | 4/1995 |
| JP | 2630604 | 7/1997 |
| JP | 200274339 | 3/2002 |
| JP | 20041658 | 1/2004 |
| WO | WO9419212 | 2/1994 |
| WO | WO9638319 | 12/1996 |

(56) References Cited

FOREIGN PATENT DOCUMENTS

| WO | WO2012139636 | 10/2012 |
|---|---|---|
| WO | WO2012139660 | 10/2012 |
| WO | WO2012143036 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.
Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Franke et al., "Autonomous driving approaches downtown", Intelligent Systems and Their Applications, IEEE 13 (6), 40-48, Nov./Dec. 1999.
IEEE 100—The Authoritative Dictionary of IEEE Standards Terms, 7$^{th}$ Ed. (2000).
Kastrinaki et al., "A survey of video processing techniques for traffic applications".
Philomin et al., "Pedestrain Tracking from a Moving Vehicle".
Sahli et al., "A Kalman Filter-Based Update Scheme for Road Following," IAPR Workshop on Machine Vision Applications, pp. 5-9, Nov. 12-14, 1996.
Sun et al., "On-road vehicle detection using optical sensors: a review", IEEE Conference on Intelligent Transportation Systems, 2004.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vlacic et al. (Eds), "Intelligent Vehicle Tecnologies, Theory and Applications", Society of Automotive Engineers Inc., edited by SAE International, 2001.
Zheng et al., "An Adaptive System for Traffic Sign Recognition," IEEE Proceedings of the Intelligent Vehicles '94 Symposium, pp. 165-170 (Oct. 1994).
International Search Report and Written Opinion date Mar. 26, 2013 for corresponding PCT Application No. PCT/US2012/064980.

\* cited by examiner

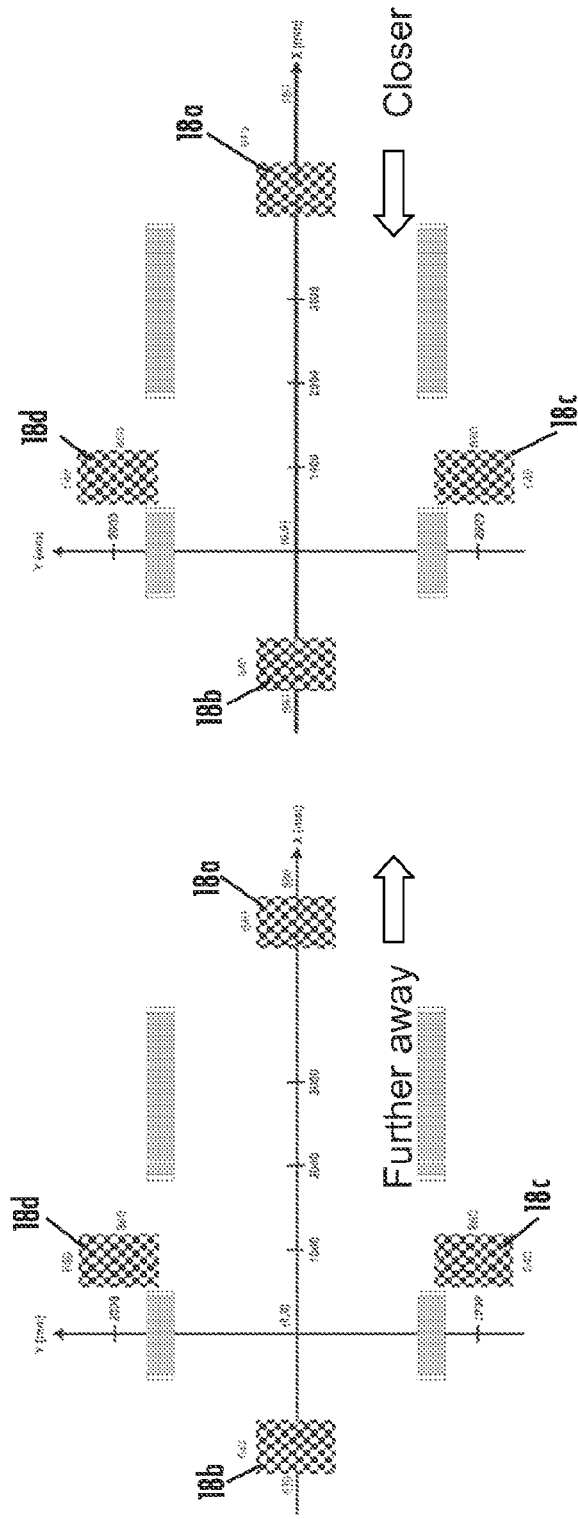

- Extrinsic calibration of a camera using extrinsic calibrated reference camera

Calibration target by laser pointer

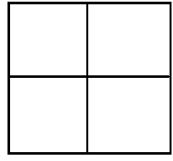
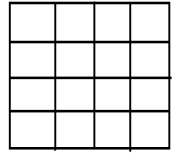

- Utilizing a laser pointer with a point approximating friendly characteristic (e.g. cross, grid lines, etc.);
- To calibrate the camera, the laser point is projected or emitted and moved in the overlap region and the system captures nearly synchronously images from both cameras;
- The system approximates the intersection point with sub pixel precision by fitting complete laser lines and calculate their intersection; and
- After collecting enough point pairs, the system starts extrinsic calculation.
- Point extraction could be improved by pulsing the laser
  - Capture consecutive images with laser enabled and disabled;
  - The subtraction of both images will eliminate static content and will highlight the laser lines;
  - The laser could be synchronized with the image taking or running free with a certain frequency, which is harmonized with the speed of the camera.

FIG. 11

CALIBRATION SYSTEM AND METHOD FOR VEHICULAR SURROUND VISION SYSTEM

CROSS REFERENCE TO RELATED APPLICATIONS

The present application is a 371 national phase filing of PCT Application No. PCT/US2012/064980, filed Nov. 14, 2012, which claims the filing benefit of U.S. provisional application Ser. No. 61/559,970, filed Nov. 15, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a calibration system for a vision system or imaging system for a vehicle that utilizes multiple cameras to capture images exterior of the vehicle, such as rearwardly and sidewardly and forwardly of the vehicle, such as for a surround view or bird's-eye view system of a vehicle. The cameras provide communication/data signals, including camera data or image data that may be displayed for viewing by the driver of the vehicle, and/or that is processed to merge the captured images from the cameras to provide or display a continuous surround view image for viewing by the driver of the vehicle. The cameras and/or image processing is calibrated to provide the continuous image or merged images.

According to one aspect of the present invention, the calibration system or method includes at least one reconfigurable calibration target that is reconfigurable to adapt the calibration system for different sizes or lengths or types of vehicles, such as at an end-of-line calibration procedure or as an aftermarket or after end-of-line calibration procedure. In one form, the calibration system or method may include an adjustable cover element for selectively covering a portion of a calibration target so as to selectively expose an appropriate portion of the calibration target to adapt the calibration system for different sizes or lengths or types of vehicles being calibrated. In another form, the calibration system or method may include at least one reconfigurable display, and the calibration system or method may be operable to adjust at least one of a size of the at least one reconfigurable display and a location of the at least one reconfigurable display by electronically generating an appropriate target display responsive to the input.

According to another aspect of the present invention, the calibration or system or method may utilize a laser emitting device to project or emit a laser line cross or grid onto a ground surface by a vehicle and in an overlapping region of two fields of view of two vehicle cameras, whereby image data captured by the two cameras is processed to determine the location of the laser lines and to calibrate or adjust a camera or image processing accordingly. Responsive to such detection or determination, the captured images can be stitched or merged together to provide a substantially seamless top-down view or bird's-eye view at the vehicle via capturing images and processing images captured by the vehicle cameras.

These and other objects, advantages, purposes and features of the present invention will become apparent upon review of the following specification in conjunction with the drawings.

BRIEF DESCRIPTION OF THE DRAWINGS

FIGS. 3 and 4 are schematics showing different calibration target positions for different length vehicle types;

FIG. 11 is a schematic of different characteristics used for calibration targets using a laser pointer;

DESCRIPTION OF THE PREFERRED EMBODIMENTS

Figure 1:
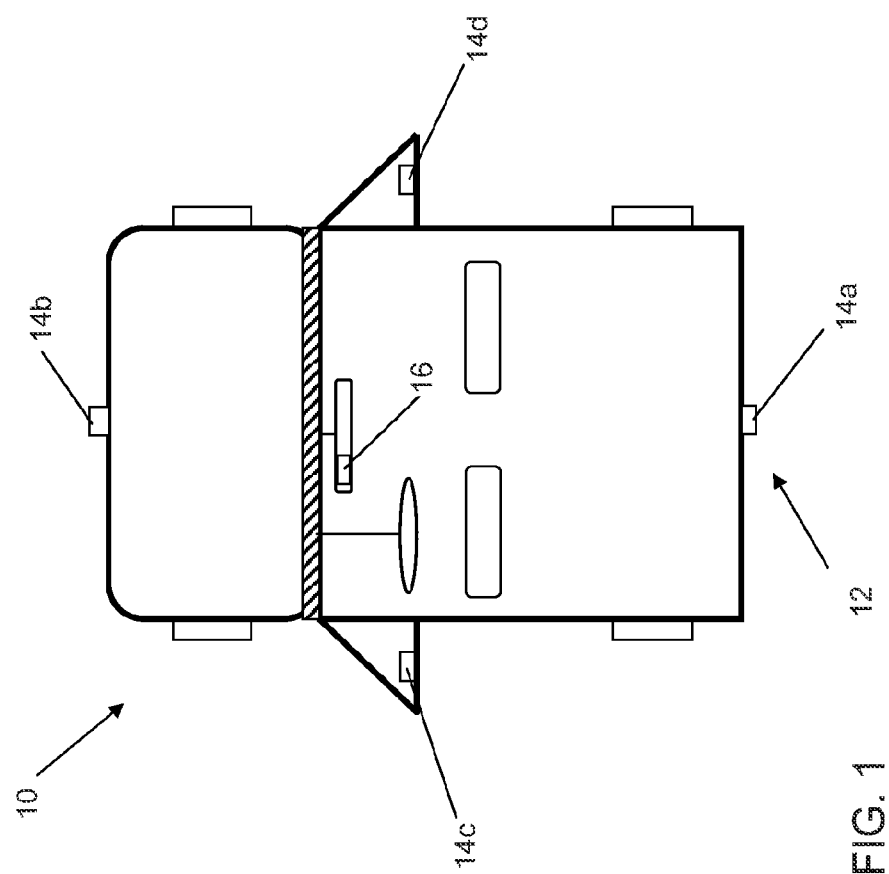
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes a plurality of imaging sensors or cameras (such as a rearward facing imaging sensor or camera 14a and a forwardly facing camera 14b at the front (or at the windshield) of the vehicle, and a sidewardly and/or rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may merge or stitch the images together to provide a top view or surround view image display at a display device 16 for viewing by the driver of the vehicle (such as by utilizing aspects of the vision systems described in PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No.

WO 2011/028686, and/or PCT Application No. PCT/CA2012/000378, filed Apr. 25, 2012, and/or U.S. patent application Ser. No. 13/333,337, filed Dec. 21, 2011, which are hereby incorporated herein by reference in their entireties). Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like. The method or system or process of the present invention is operable to process image data and calibrate the cameras so the images are accurately or optimally merged together to provide the top down or surround view display, as discussed below.

It is not uncommon at a vehicle assembly plant that the vehicle assembly line produce a mixture of vehicle types and sizes. Thus, for example, a sedan type vehicle may be immediately followed on the moving assembly line by an SUV type vehicle or a station wagon type vehicle or crossover type vehicle or the like. Some or all of this mixture of vehicle types/sizes being conveyed along the moving vehicle assembly line may be equipped with a multi-camera system that desires/requires calibration before the subject or equipped vehicle exits the assembly line. Typically, such calibration is achieved at the likes of a wheel balance station. In accordance with the present invention, when a subject multi-camera equipped vehicle of a given vehicle type/size enters the camera calibration station, a signal indicative of that vehicle type is automatically transmitted to a control that controls the various calibration targets disposed at the calibration station (typically for a surround view/bird's eye multi-camera system and typically disposed on the ground adjacent the calibration station). Responsive to receipt of that signal, the individual calibration targets are adjusted or customized to the calibration needs or specifications of that particular vehicle type. Such customization can be achieved in several ways, such as by occlusion of portions of an individual calibration target, such as via the likes of a movable cover or curtain or shroud or mask or the like. Optionally, the calibration target itself may be a reconfigurable electronic calibration target display that can reconfigurably customize the visible calibration target (that is visible or detectable or sensed by the camera or cameras being calibrated) to the expectations and/or needs of the particular vehicle type being calibrated. For example, such reconfigurable targets may comprise a large area plasma display or a large area LED or OLED display or a backlit LCD display or an e-ink display or the like, such as are commonly known in the display arts. This aspect of the present invention is also applicable to forward facing imagers (and/or optionally rearward facing imagers) utilized for the likes of automatic headlamp control, lane departure warning, forward collision warning, traffic sign recognition, vehicle detection and pedestrian detection and/or the like (such as described in U.S. Pat. Nos. 5,550,677; 5,670,935; 5,760,962; 5,796,094; 5,877,897; 6,302,545; 6,396,397; 6,690,268; 7,859,565; 8,027,029 and/or 8,070,332, which are all hereby incorporated herein by reference in their entireties), where a reconfigurable electronic target may be disposed forward of the vehicle so as to be viewed by the forward facing imager as the vehicle equipped with the imager passes along the assembly line and/or while the vehicle is at a calibration station for other exterior viewing cameras of that vehicle (such as, for example, a surround view/bird's eye system). The calibration system thus may provide a reconfigurable calibration target (or multiple reconfigurable calibration targets) that is/are reconfigurable to adapt the calibration system for the particular size/type of vehicle that is at the calibration station.

Figure 2:
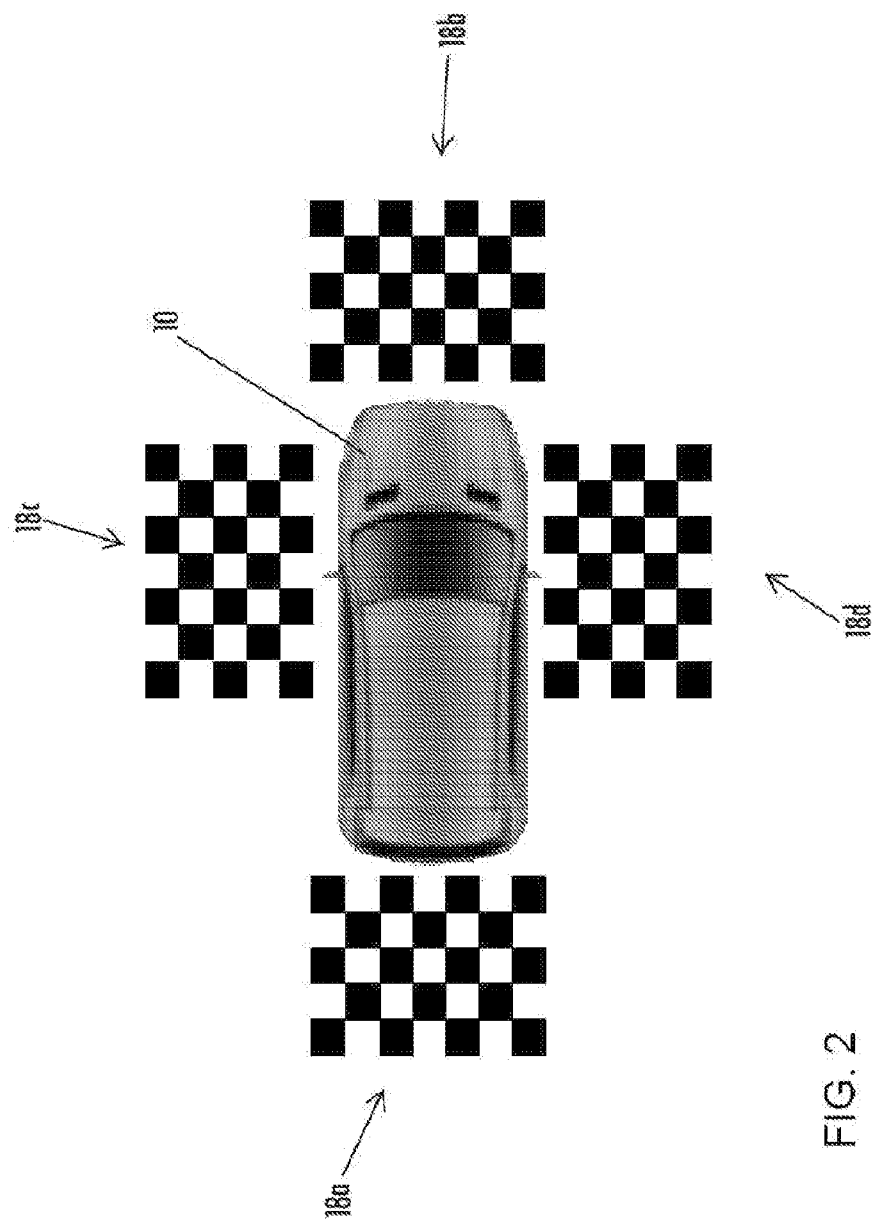
FIG. 2 is a plan view of a vehicle with checkerboard mats around the vehicle for calibrating the vehicle cameras.
Figure 16:
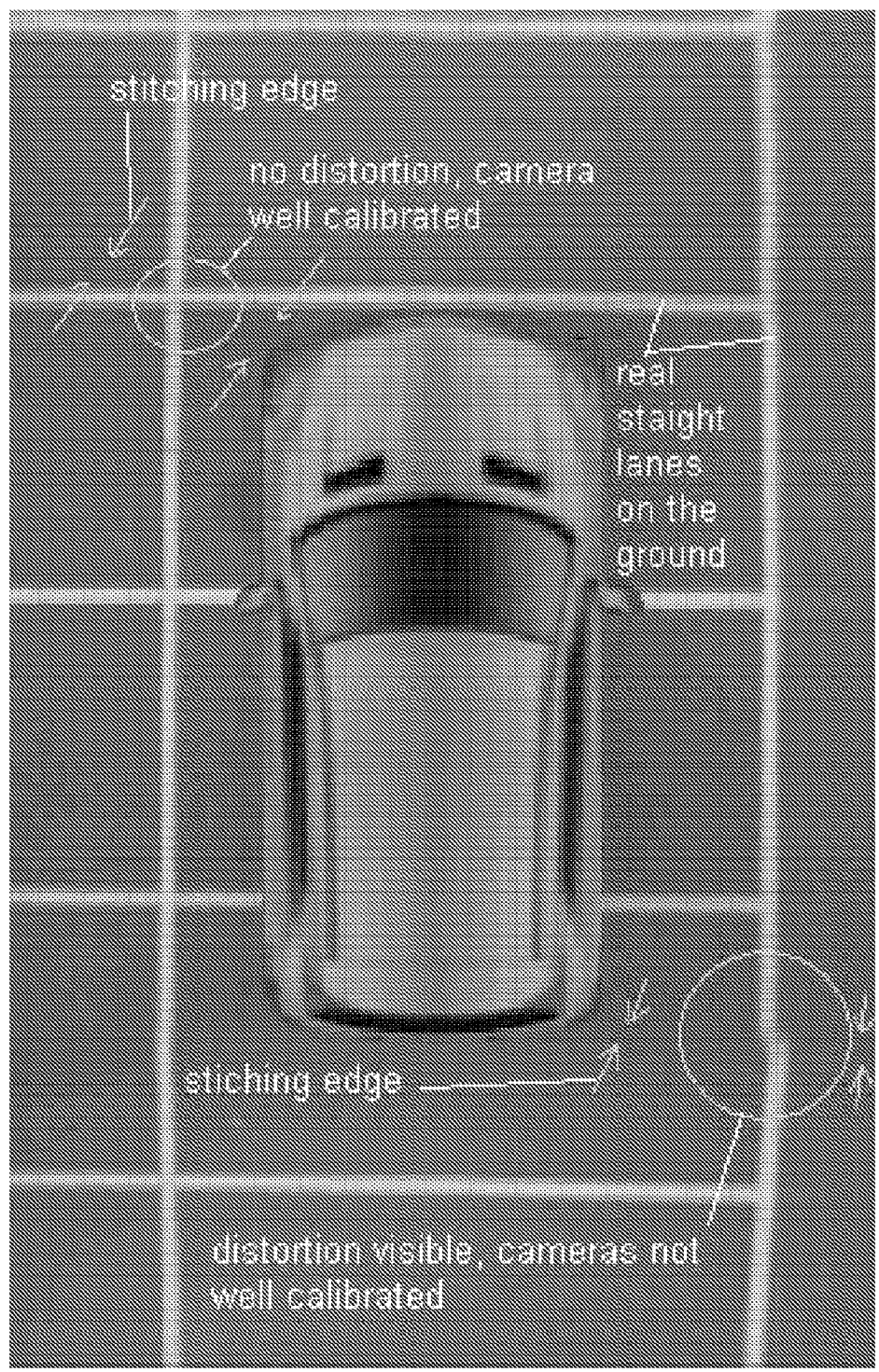
FIG. 16 shows a four camera top view at the condition having three cameras well calibrated and the rear camera misaligned.

FIG. 16 shows an example of a four camera top view at the condition having three cameras well aligned (calibrated) and one camera misaligned (miscalibrated). It comes to breaks of strait lines (in nature) crossing stitching borderlines. For hindering or correcting miscalibration typically, cameras and/or processing of such vehicular surround view vision systems are calibrated at an end of line calibration process at the vehicle assembly plant. Such calibration systems typically comprise a plurality of calibration targets 18a, 18b, 18c, 18d fixed on the ground, whereby the vehicle 10 is driven to a position generally at the center of the targets, such as shown in FIG. 2. Vehicle production lines are often used for more than one vehicle type or platform. The consequences of these generalizations or shared production lines are that the vehicle dimensions vary and, in end-of-line calibration zones or areas, the calibration targets can often only be optimally positioned for one vehicle variant or type or lengths, and thus may be less than optimally positioned for other vehicle variants or types or lengths. Only one target is typically placed at each target position because the end-of-line processing algorithms may get confused if more than one calibration target is visible in the field of view of the camera. Thus, the calibration system or process may be designed for one vehicle type or variant to provide optimal calibration of that vehicle type, while the calibration for the other vehicle types that are manufactured at that production line or facility may be less than optimal. Thus, the end-of-line calibration results may not be optimized or precise for all of the vehicle types manufactured at a given assembly facility or production line.

As can be seen with reference to FIGS. 3 and 4, due to different length and sized vehicles, the position of the cameras relative to the calibration targets vary because of the dimensions of the vehicle that is being calibrated, which results in the distance between the cameras and the respective targets sometimes being greater and sometimes being smaller or reduced. Thus, algorithmic adjustment of the processing may be needed to adapt the processing for the particular distances between the cameras and calibration targets during the calibration process.

It is desirable to have the targets at fixed or constant or non-varying distances from the cameras for all vehicles so that the processing algorithms may be configured or optimized for enhanced precision and thus enhanced calibrating of the system. For example, in order to optimize the calibration of systems on different length vehicles, the target 18a in FIG. 3 should be disposed further away from target 18b to accommodate a longer vehicle type, while the target 18a in FIG. 4 should be disposed closer to target 18b to accommodate a shorter vehicle type.

Figure 5:
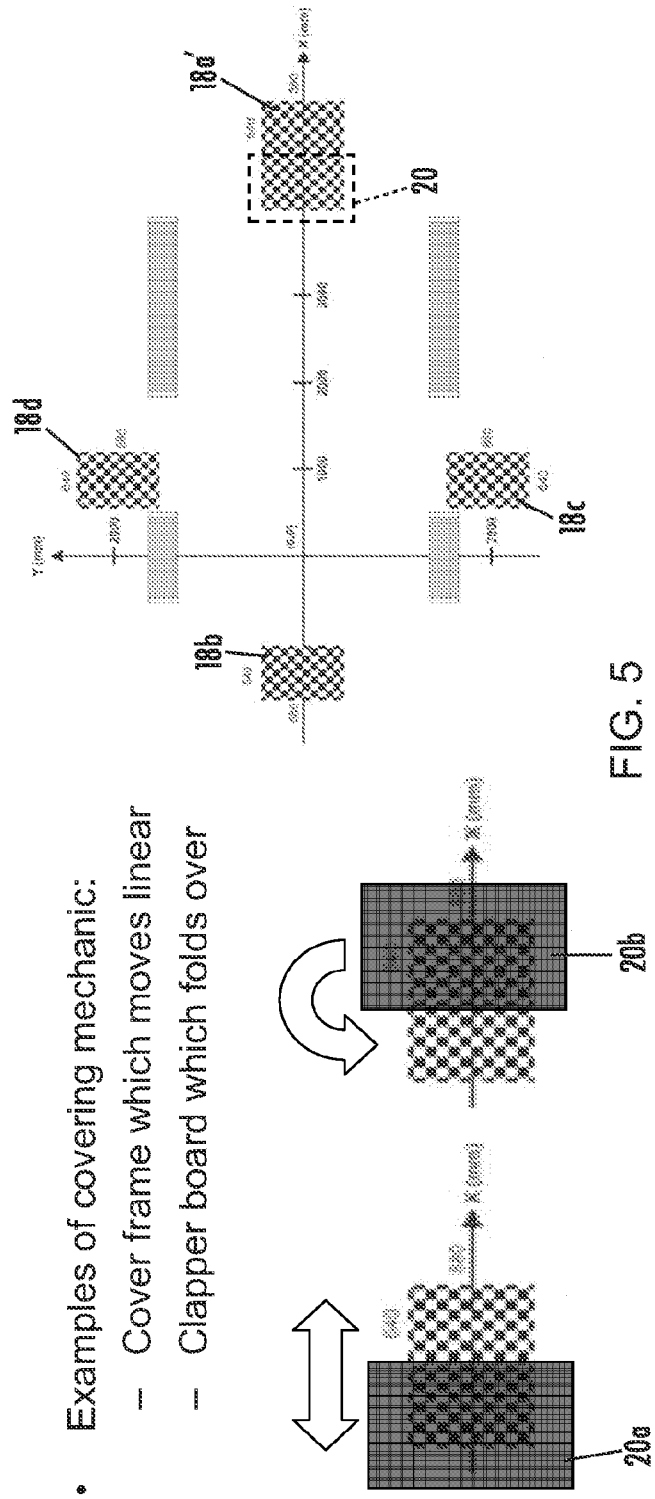
FIG. 5 is a schematic showing an adjustable calibration target that is adjustable to accommodate different length vehicle types.
Figure 6:
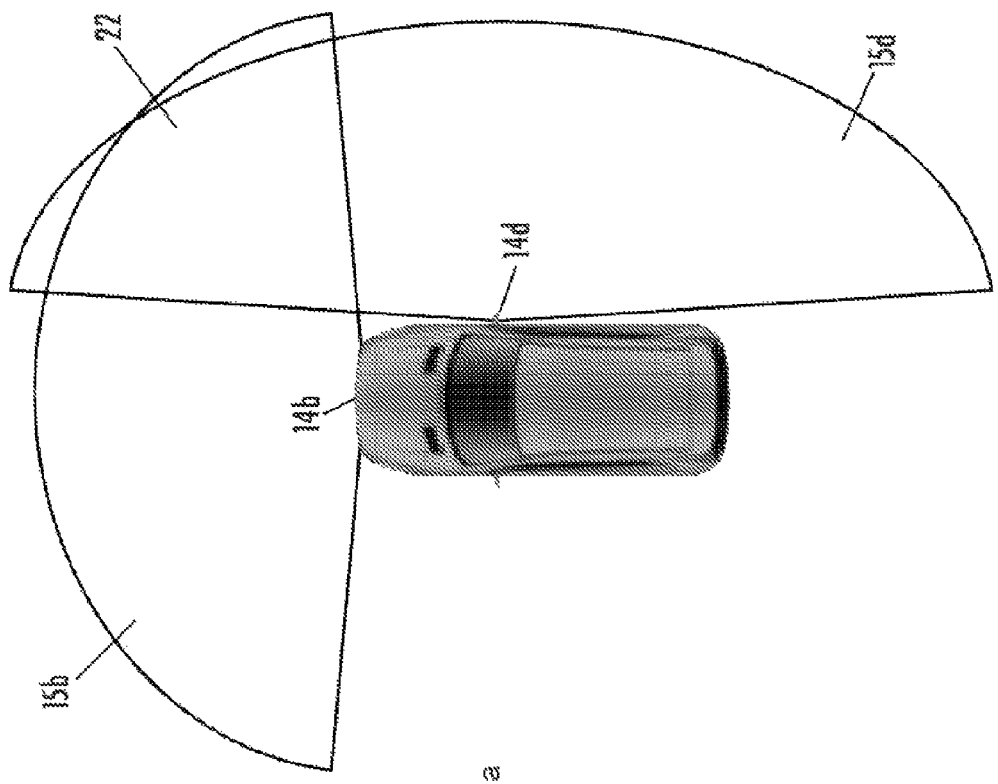
FIGS. 6-10 are plan views of a vehicle, showing overlapping fields of view for calibrating one or more of the vehicle cameras.
Figure 7:
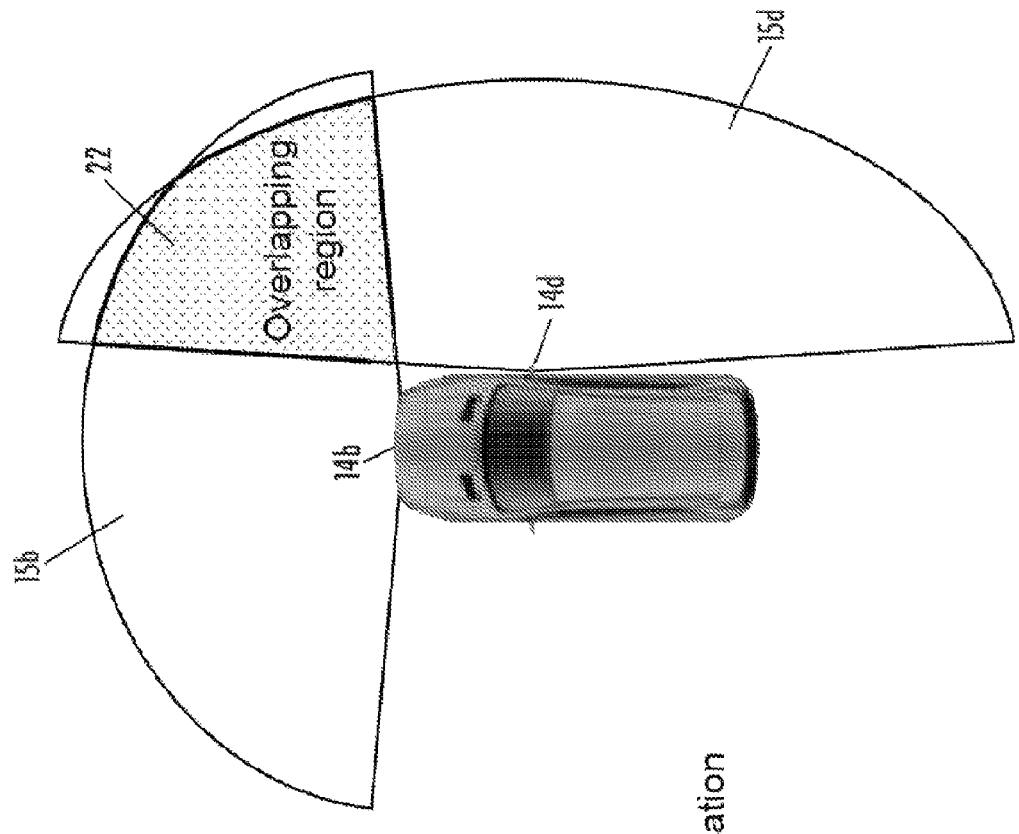
Figure 8:
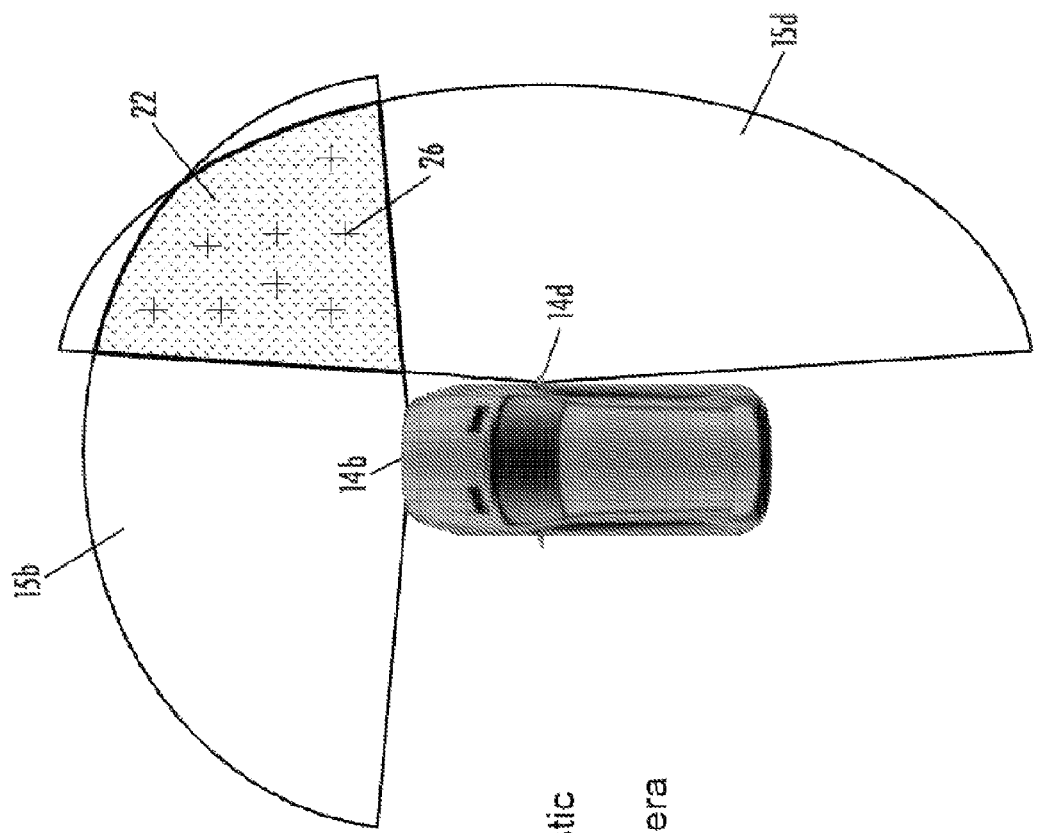
Figure 9:
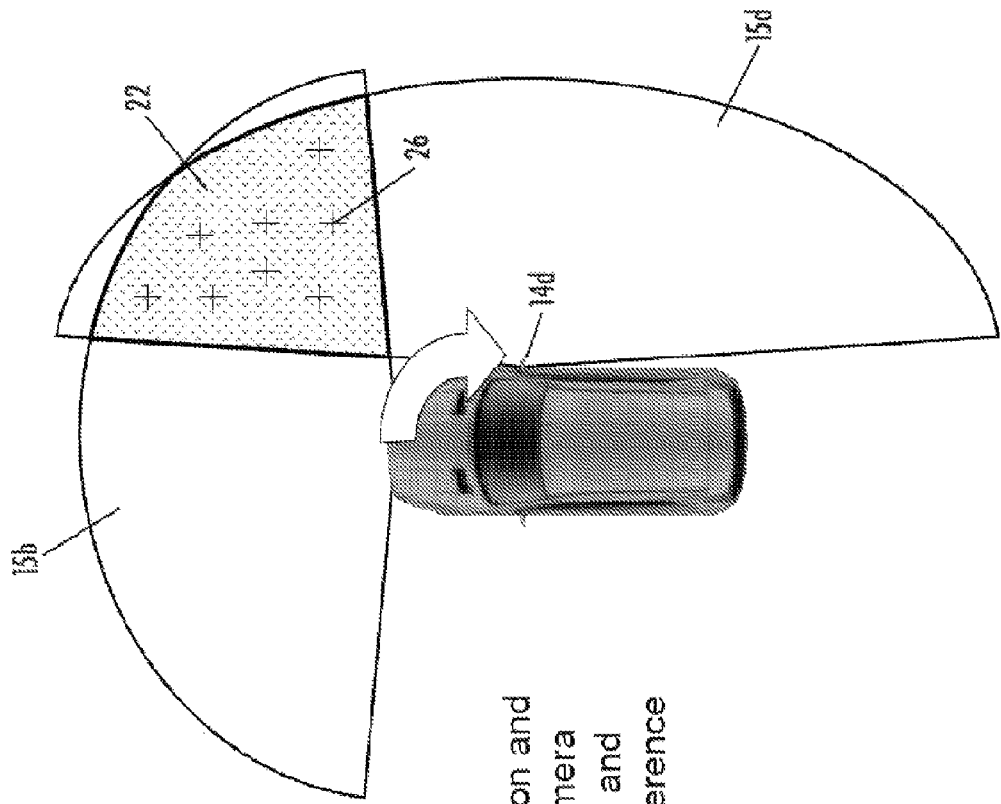

The present invention provides multiple targets at the calibration area or zone (and optionally may provide multiple targets at one or more of the target locations, such as the front, sides and/or rear of the vehicle, or larger targets at one or more of the target locations), and the different targets or portions of the targets are selectively exposed (or different sized and located targets are selectively generated, such as via a reconfigurable display or the like that is reconfigured for the vehicle being calibrated) for different vehicle sizes or types while the non-used targets or target portions (the targets or target portions that are not needed for calibrating the particular vehicle being calibrated) are selectively covered, such as by a mechanical device or the like (such as shown in FIG. 5).

In the illustrated embodiment, of FIG. 5, target 18a' comprises a larger elongated target that encompasses the areas covered by the targets 18a in FIGS. 3 and 4. A cover or blocking or hiding element 20 is disposed at the larger target 18a', and is selectively disposed at or over a portion of the target 18a' that is not needed for calibrating the particular vehicle that is at the calibration area or zone. The cover 20 may comprise any suitable covering or blocking element. For example, the cover element or panel or frame may comprise a movable panel or frame 20a (FIG. 5) that is generally linearly movable over and along the larger target to one of at least two positions to block the non-used portion of the target, while exposing the portion of the target that is appropriate for the particular vehicle or vehicle type that is present at the calibration zone (i.e., at the appropriate distance from the respective camera for that particular vehicle or vehicle type).

Optionally, the cover element or panel or frame may comprise a panel that may be flipped between two positions, with the cover, when in a first position, covering about a half of the target 18a' and, when in a second position, covering about the other half of the target 18a'. For example, the cover may pivot or flip via a hinged mounting or attachment at or near the target, with the cover panel hingedly mounted at the target and being pivotable about its hinge axis between its first and second covering positions.

Thus, the end of line calibration process or system of the present invention provides enhanced or optimized calibration target positions for multiple vehicle types or sizes. Thus, the processing algorithm that calibrates the cameras and/or vision system may be common for all vehicles and may calibrate all sizes or types of vehicles in a similar manner and to a similar degree of precision. Although shown and described as having a cover that is movable over a larger target between two positions, it is envisioned that multiple covers and/or multiple covering positions may be provided to selectively expose more than two portions of a larger target to adapt the calibration system for three or more types or lengths or sizes of vehicles. Also, although shown and described as providing a movable cover at one target that is at the front or rear of the vehicle being calibrated, it is envisioned that a target or targets at the side or sides of the vehicle may also be selectively exposed/covered to adapt the calibration system for different width vehicles and/or for vehicles with the side cameras disposed at different locations along the vehicles (relative to the front and/or rear of the vehicle). It is further envisioned that the calibration system may comprise one or more calibration targets that are movable along the floor of the target zone to position the calibration target at an appropriate location relative to the camera/cameras of a vehicle at the calibration zone (for example, the target may mechanically move along the floor of the calibration station or target zone or may be otherwise mechanically reconfigured or a target may be projected or displayed or reconfigured to provide the desired size and location of the targets at the floor of the calibration station or target zone). The calibration system or method of the present invention thus provides selective exposure and blocking/hiding of portions of at least one calibration target (or selective generation or reconfiguration of different sized and located targets) at a calibration zone to adapt the calibration system for different types or sizes of vehicles, such that the same or common processing or calibrating algorithm provides enhanced or optimal processing and calibration of the vehicle systems for two or more vehicle types or sizes.

Even though the vehicle vision system may be optimally calibrated when the vehicle leaves the production facility, one or more cameras of the vehicle vision system may become uncalibrated or decalibrated as the vehicle is driven and over time and during usage of the vehicle or when replacing one or more cameras. When this happens, the decalibrated camera(s) must be re-calibrated to again properly function.

Figure 10:
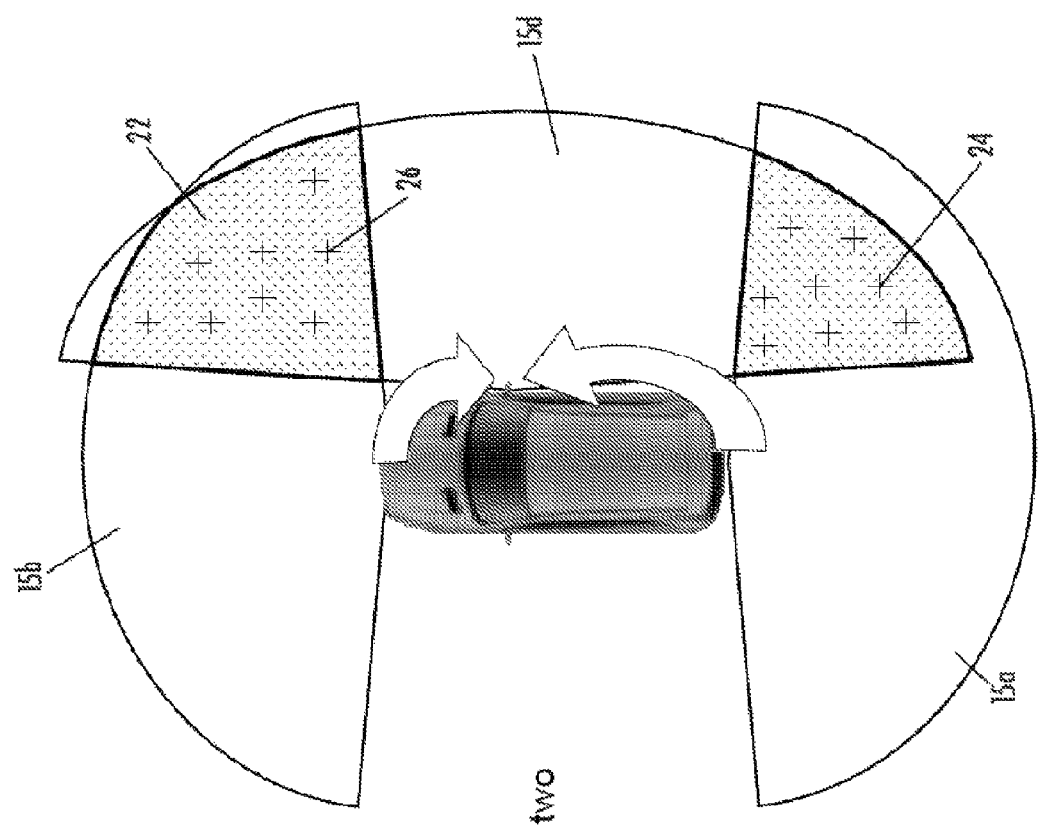

The present invention also provides an aftermarket or after end-of-line calibration process that calibrates one or more decalibrated cameras of a vehicle (such as at a service station or the like). The recalibration process or system of the present invention comprises use of a handheld laser calibration target tool that emits a beam pattern at an overlapping field of view area of two cameras, whereby the system may detect the location of the beam pattern in each of the two cameras' fields of view and adjust or recalibrate the decalibrated camera accordingly. As shown in FIGS. 6-10, a calibration system may perform extrinsic calibration of a decalibrated camera (such as, in the illustrated example, the side camera 14d of vehicle 10) using an extrinsically calibrated reference camera (such as, in the illustrated example, the front camera 14b), and using the overlapping regions 22 of the fields of view 15b, 15d of the cameras 14b, 14d for the calibration. The calibration system may detect one or more characteristic points 26 that are or can be found in both camera fields of view 15b, 15d and in the overlapping region 22. The camera position and orientation of the decalibrated camera 14d is fitted or adjusted based on the known position and orientation of the reference camera or calibrated camera 14a. For example, the system may extract the camera position and orientation of the calibrated or reference camera 14a to calibrate the decalibrated camera 14d knowing the position and orientation of the reference camera. As shown in FIG. 10, the accuracy of the calibration system may be enhanced by using two overlapping regions, such as overlapping region 22 of the fields of view 15b, 15d of the front and side cameras 14b, 14d and overlapping region 24 of the fields of view 15a, 15d of the rear and side cameras 14a, 14d in the illustrated example.

Figure 12:
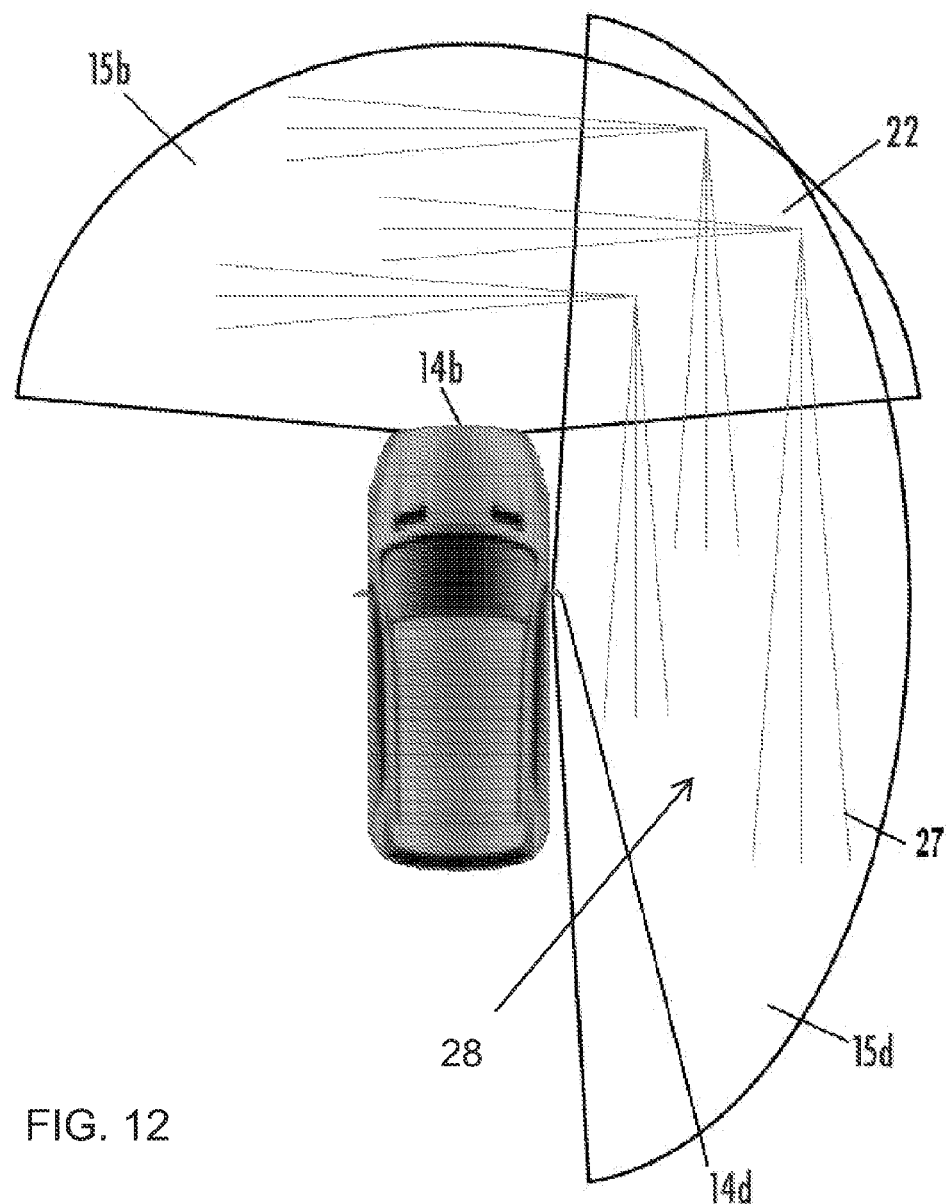
FIG. 12 is a schematic showing projected straight lines within the cameras' views starting at a camera view center region and meeting at a common point within the overlapping area of two adjacent cameras views.
Figure 13:
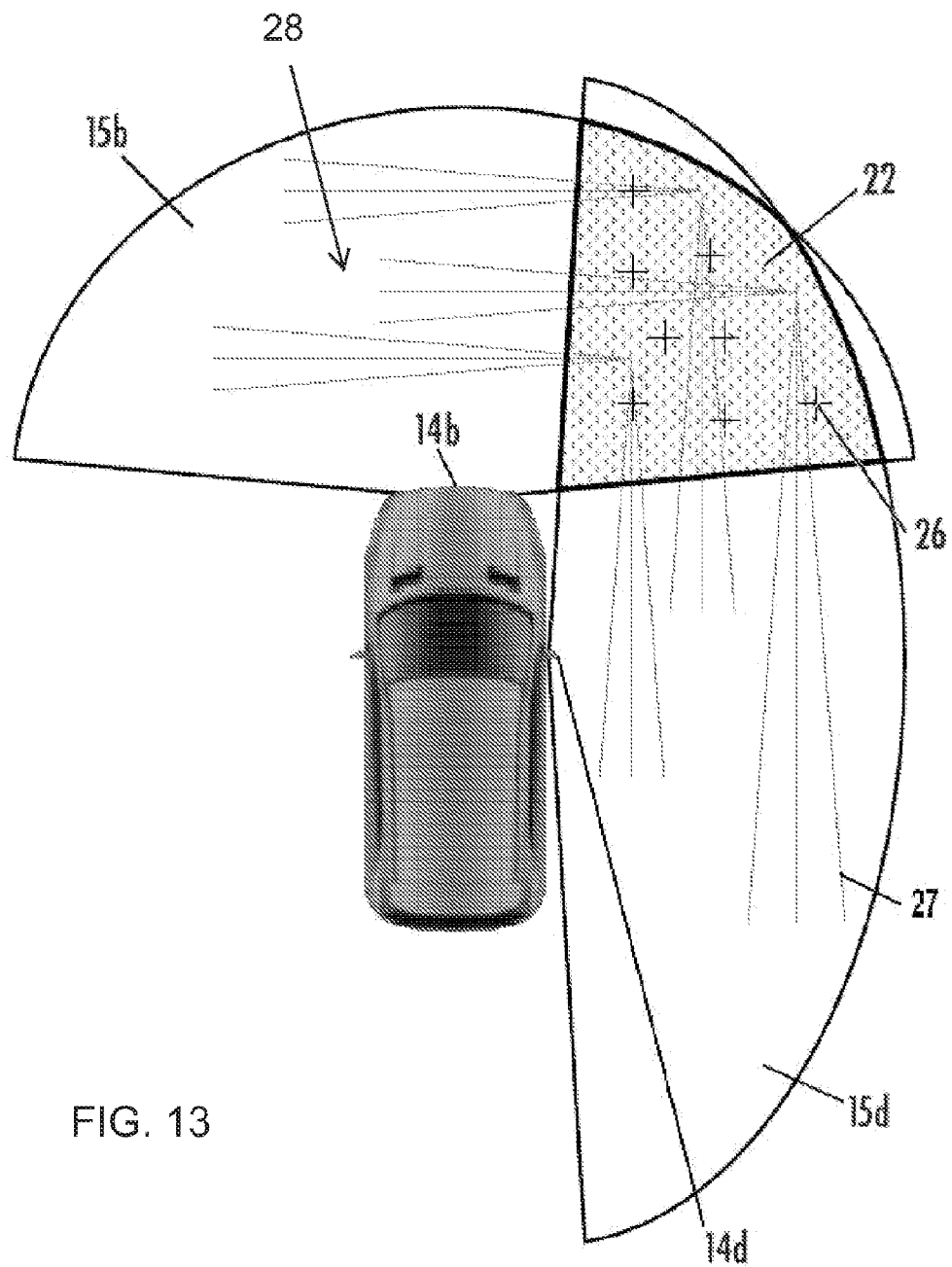
FIG. 13 is a schematic showing both a projected pattern in the overlapping area and projected straight lines.
Figure 14:
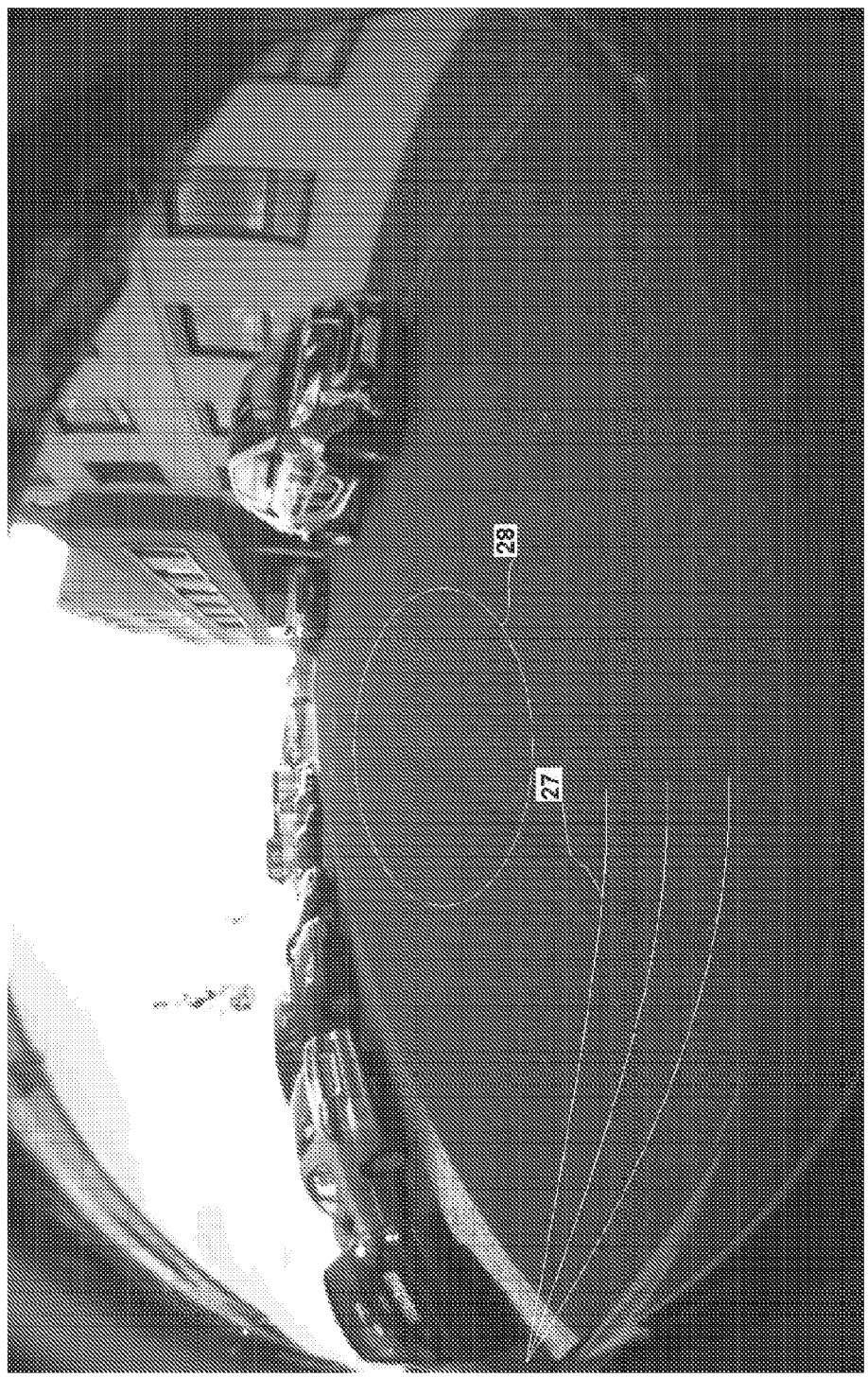
FIG. 14 shows a vehicle camera view, shown with the center of the field of view highlighted (28), and with the straight lines (27) appearing curved or shaped according to the fish eye view's distortion off the center.

As an addition or alternative to the inventive system discussed above, the system may not just utilize the dedicated points of a projected pattern within the overlapping region, but also a pattern, or preferably straight lines, which extends not just over the overlapping region but beyond its borderlines. It is suggested to place (drawing or sticking to a target on the ground or preferably projecting) straight lines 27, which start in the center region 28 of the field of view of the respective cameras at a distance from the vehicle and that end or meet or cross or intersect at a common point within the overlapping view region, such as shown in FIG. 12 (with FIG. 13 showing both a projected pattern in the overlapping area and projected straight lines). Since the surround view cameras may all comprise fisheye lenses (or wide angle image distorting lenses or lens systems or lens optics) at the imaging sensor or pixelated imaging array of the respective camera (thus providing a wide angle "fisheye" field of view), the center region 28 has a much better resolution as compared to the regions at the far ends at the side as like in the overlapping region, such as can be seen with reference to FIG. 14. By detecting the line directions in each camera's center region, the system may be operable to determine the crossing points at the far ends of the lines even when these are hardly discernible or discriminable in the overlapping region (done for both respective cameras of one overlapping region). This method and algorithm allows for a more accurate calibration of the cameras. The accuracy will be dependent, at least in part, on the resolution of the camera in the center region of the field of view.

Typically, the limiting for discriminating differences within the center of a fisheye image is the pixel resolution. This means the smallest area which can be discriminated equates to the covering area of one pixel plus/minus the range until a neighboring pixel becomes triggered. Assuming a round covering area this is typically a half pixel steradian.

$$\text{Accuracy steradian} = \frac{\text{steradian}}{\text{per Pixel}} \cdot (1 + / -0, 5) \text{ Pixel}$$

Figure 15:
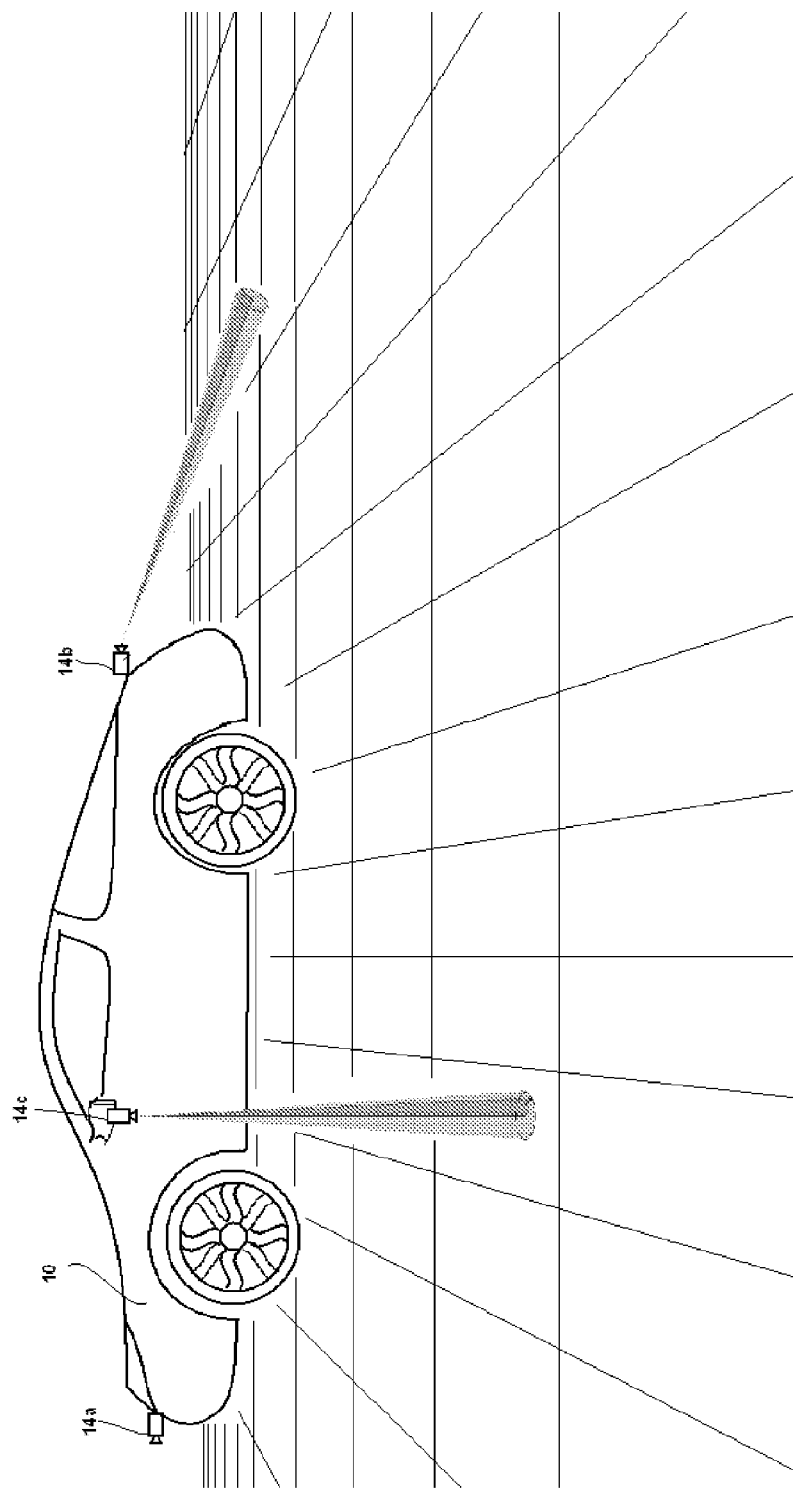
FIG. 15 shows a side view schematic of a vehicle having front rear and side cameras, shown with two exaggerated cones that illustrate how a pixel's covering area increases with increasing distance to the camera.

The covering area of one pixel is typically more as like a square. Since the covering area is a steradian (or two orthogonal angles describing the width and heights of a square), the covered area increases exponentially with increasing distance such as like illustrated in FIG. 15.

According to another aspect of the present invention, the projection device may comprise a hand held device or a device mounted on a tripod or such which possesses a wired or wireless data connection attached to or linked to or in communication with the calibration system for instructing the person operating the hand held device if and how to change the projecting position or to control the projection direction automated or half automated. The tripod or device may have actuators to do this. The operator may have to carry the projector around the vehicle at least once to calibrate all of the overlapping regions.

When calibrating cameras using the overlapping camera views, the process of localizing corresponding points in the overlapping camera views can be challenging. The probability of localizing a point in both views is higher at points at the ground plane and is lower at points that are on an object or objects having a height or distance above the ground plane. Also, the resolution of images in the overlapping regions may be quite low, such that several points or characteristics may be needed to get sufficient precision by statistic analysis. Thus, successfully extracting points from a real world scene may be highly dependent on the surrounding textures or contours or objects at or near the vehicle and in the overlapping fields of view and on the lighting conditions at or near the vehicle. Because of this, the checkerboard targets (such as shown in FIG. 2) are used for calibration purposes, but, because of the low resolution in the overlapping image region, the rectangles of the checker board may have to be large, and thus less corresponding points may be found and used for fitting the captured images and calibrating the decalibrated camera.

The present invention provides a calibration process or system or method that utilizes a laser pointer with a point approximating friendly characteristic (such as, for example, a cross or grid lines or the like, that form points via the crossing or intersection of the laser lines). In order to calibrate the camera, the laser pointer is moved or established in the overlap region and images are captured nearly synchronously with both cameras (such as the front and side cameras as shown in FIGS. 6-10). The system may approximate the intersection point or points with sub pixel precision by fitting complete laser lines and may determine or calculate their intersection. After the system collects enough point pairs (points that are present in the overlap region and captured by both cameras), the system can begin or conduct extrinsic calculations.

Optionally, point extraction by the cameras and system may be improved by pulsing the laser, whereby consecutive images may be captured with the laser enabled and then disabled. The subtraction of both images will eliminate static content and will highlight the laser lines in the overlapping region. Optionally, the laser may be synchronized with the image capturing frame rate or running at a certain frequency, which may be harmonized with the speed or frame rate of the cameras.

An aftermarket or service center (such as a Ford or General Motors or Toyota dealership or the like) may have to recalibrate a multi-camera system due to, for example, replacement of a broken away camera-equipped exterior mirror that forms part of the subject vehicle's multi-camera system. The particular vehicle type (for example, a Mercedes C-Class or E-Class or M-Class or the like) will require its own particular calibration target or targets at the service center. In accordance with the present invention, a light projection system is provided at the dealership (or other location suitable for use as a camera calibration station) that projects the required lines or targets onto the ground adjacent the to-be-calibrated subject vehicle in the form of a projected light pattern or target. And the particular pattern projected is electronically selective by the service center or technician in the appropriate form for that particular vehicle type being serviced. Preferably, the projected pattern on the ground is produced by use of a laser/movable mirror or a movable laser projection system that by rapidly moving a laser light beam effectively "writes" the desired pattern onto the floor adjacent the subject vehicle. In accordance with this aspect of the present invention, the service technician need only key in or input the particular vehicle model or type to be calibrated, and the projection system of the present invention then automatically and appropriately generates or "writes" the desired or appropriate or selected calibration pattern on the ground in a manner appropriate for multi-camera calibration for that particular vehicle model. Alternatively, any light projector, such as with an appropriate mask, may be used (such as a mask that is electronically reconfigurable such as by using a transmissive liquid crystal panel or the like).

Thus, the present invention provides an after end-of-line calibration process or system or method (such as an aftermarket calibration system or the like at a vehicle service station or the like) that enhances detection of common points in the overlapping regions of two adjacent cameras of the vehicle (such as an overlapping field of view portion of the front and side cameras or the rear and side cameras). The system or procedure may comprise, for example, parking the vehicle at a generally flat surface with about a two meter open or un-blocked space around the perimeter of the vehicle, at least at the fields of view of the decalibrated camera and the adjacent reference camera. The calibration function is activated for a particular camera (such as a decalibrated camera or a camera which may be a threshold degree of calibration) or for the entire vision system. The system may prompt a service technician or user to generate or present the calibration target at a particular overlapping region by the vehicle, whereby the service technician or user may enable and use the handheld laser calibration target tool and may direct or place the focus point of the emitted grid or cross or the like in the overlap region of the two cameras. The characteristic of the created or generated target will show pairs of lines in both of the camera views that encompass the overlapping region.

If the system detects the focus point of the calibration target with good or sufficient precision, the system may acknowledge such detection, such as with an alert or visual or audible signal, so that the service technician knows that the focus point was detected. The system may then prompt the user or service technician to modify the location or position of the focus point (while maintaining the focus point in the overlapping region). This procedure may be repeated multiple times until enough points are detected and extracted for both or all of the cameras that are necessary to calibrate the camera or cameras. When the system has detected and captured images of a sufficient number of focus points, the service calibration system is operable to calculate and calibrate the cameras from the focus point image data. Because the focus points are at the ground level by the vehicle and are actual and consistent lines and points (at the intersection of the laser lines), the present invention provides enhanced detection and recognition and processing of the focus points in the captured images and thus enhanced processing of the image data and calibration of the cameras.

Thus, using the laser focus point system of the present invention, the point extraction is independent of the ground texture or contours or objects surrounding the vehicle and is independent of the lighting conditions at or surrounding the vehicle. Also, during the calibration procedure, the number of extracted points could be readily increased, and the precision of the extracted extrinsic parameters may be adjusted. With the use of the laser focus points, the laser focus points can be generated or projected or emitted at any locations in the overlapping portion of the fields of view, and no alignment of targets is necessary. The camera images between the different views should be made nearly synchronously, and, by using differential images, at least two images are stored in internal memory during the calibration process. At least one reference camera with known extrinsic parameters is necessary, and then the adjacent camera or cameras can be calibrated accordingly.

The imaging sensor or camera that captures the image data for image processing may comprise any suitable camera or sensing device, such as, for example, an array of a plurality of photosensor elements arranged in at least 640 columns and at least 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and/or PCT Application No. PCT/US2012/048110, filed Jul. 25, 2012, and/or PCT Application No. PCT/CA2012/000378, filed Apr. 25, 2012, and/or PCT Application No. PCT/US2012/056014, filed Sep. 19, 2012, and/or PCT Application No. PCT/US12/57007, filed Sep. 25, 2012, and/or PCT Application No. PCT/US2012/061548, filed Oct. 24, 2012, and/or PCT Application No. PCT/US2012/062906, filed Nov. 1, 2012, and/or PCT Application No. PCT/US2012/063520, filed Nov. 5, 2012, and/or U.S. patent application Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional application Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/563,965, filed Nov. 28, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, and/or U.S. provisional application Ser. No. 61/650,667, filed May 23, 2012; Ser. No. 61/579,682, filed Dec. 23, 2011; Ser. No. 61/565,713, filed Dec. 1, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional application Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and/or U.S. patent application Ser. No. 13/333,337, filed Dec. 21, 2011, and/or U.S. provisional application Ser. No. 61/615,410, filed Mar. 26, 2012; Ser. No. 61/588,833, filed Jan. 20, 2012; Ser. No.

61/570,017, filed Dec. 13, 2011; and/or Ser. No. 61/568,791, filed Dec. 9, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A camera calibration system for calibrating at least one camera of a vehicle, said camera calibration system comprising:

at least one reconfigurable calibration target established at a ground area at or proximate where a vehicle is positioned for a camera calibrating procedure;

wherein said camera calibration system is operable, responsive to an input indicative of a type or size of the vehicle positioned at the ground area, to electronically reconfigure said reconfigurable calibration target to adapt said reconfigurable calibration target for that particular type or size of vehicle positioned thereat; and wherein, with the vehicle positioned for the camera calibrating procedure and with said reconfigurable calibration target adapted for that particular type or size of vehicle, at least one camera of the vehicle has a field of view that at least partially encompasses said at least one adapted reconfigurable calibration target.

2. The camera calibration system of claim 1, wherein said at least one reconfigurable calibration target comprises a plurality of reconfigurable calibration targets.

3. The camera calibration system of claim 2, wherein at least some of said reconfigurable calibration targets are established at side regions of the vehicle positioned at the ground area.

4. The camera calibration system of claim 2, wherein said reconfigurable calibration targets comprise checkerboard type targets disposed at forward, rearward and sideward regions of the vehicle positioned at the ground area.

5. The camera calibration system of claim 2, wherein at least one of said reconfigurable calibration targets comprises a larger reconfigurable calibration target as compared to at least one other of said reconfigurable calibration target.

6. The camera calibration system of claim 5, wherein said one of said reconfigurable calibration targets comprises a forward or rearward one of said reconfigurable calibration targets.

7. The camera calibration system of claim 1, wherein said camera calibration system is operable to reconfigure at least one of a size of said at least one reconfigurable calibration target and a location of at least one of said at least one reconfigurable calibration target.

8. The camera calibration system of claim 7, wherein said camera calibration system reconfigures said at least one reconfigurable calibration target via a covering element that selectively exposes a portion of said at least one reconfigurable calibration target and covers another portion of said at least one reconfigurable calibration target.

9. The camera calibration system of claim 8, wherein said covering element comprises a linearly movable covering element that is movable along and over said one of said reconfigurable calibration target.

10. The camera calibration system of claim 8, wherein said adjustable covering element comprises a pivotable covering element that is pivotable about a hinge element between first and second covering positions.

11. The camera calibration system of claim 1, wherein said at least one reconfigurable calibration target comprises at least one reconfigurable display.

12. The camera calibration system of claim 11, wherein said camera calibration system is operable to adjust at least one of a size of said at least one reconfigurable display and a location of said at least one reconfigurable display by electronically generating an appropriate target display responsive to said input.

13. The camera calibration system of claim 12, wherein said at least one reconfigurable display comprises a plurality of reconfigurable displays.

14. The camera calibration system of claim 13, wherein said camera calibration system electronically generates a reconfigurable display at at least some of the forward, rearward and sideward regions of the vehicle positioned at the ground area.

* * * * *